United States Patent
Chen et al.

(10) Patent No.: US 10,205,675 B2
(45) Date of Patent: Feb. 12, 2019

(54) DYNAMICALLY ADJUSTING RESOURCES TO MEET SERVICE LEVEL OBJECTIVES

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/297,871

(22) Filed: Oct. 19, 2016

(65) Prior Publication Data
US 2018/0109464 A1    Apr. 19, 2018

(51) Int. Cl.
| | |
|---|---|
| *G06F 15/173* | (2006.01) |
| *H04L 12/911* | (2013.01) |
| *G06F 9/00* | (2006.01) |
| *G06F 11/00* | (2006.01) |
| *H04L 12/24* | (2006.01) |

(52) U.S. Cl.
CPC ............. *H04L 47/70* (2013.01); *G06F 9/00* (2013.01); *G06F 11/00* (2013.01); *H04L 41/0896* (2013.01); *H04L 41/5009* (2013.01); *H04L 41/5019* (2013.01)

(58) Field of Classification Search
CPC ........ H04L 47/70; H04L 67/10; H04L 43/045
USPC ......... 709/226, 213, 224; 370/338, 230, 235
See application file for complete search history.

(56) References Cited

U.S. PATENT DOCUMENTS

| | | | |
|---|---|---|---|
| 7,284,054 B2 | 10/2007 | Radhakrishnan | |
| 7,752,623 B1 | 7/2010 | Crawford, Jr. | |
| 7,996,842 B2 | 8/2011 | Savit | |
| 8,482,444 B1* | 7/2013 | Dominguez | 341/155 |
| 8,738,972 B1 | 5/2014 | Bakman et al. | |
| 9,323,628 B2 | 4/2016 | Ngo et al. | |
| 2006/0244754 A1* | 11/2006 | Beda | G06T 15/005 345/557 |
| 2013/0166724 A1* | 6/2013 | Bairavasundaram | G06F 9/5016 709/224 |

(Continued)

FOREIGN PATENT DOCUMENTS

WO    2015/197564 A1    12/2015

OTHER PUBLICATIONS

Heapster Scalability Testing #5880, 2015, link: https://github.com/kubernetes/kubernetes/issues/5880.

(Continued)

*Primary Examiner* — Thuong Nguyen
(74) *Attorney, Agent, or Firm* — K&L Gates LLP (57) ABSTRACT

The present disclosure provides for dynamic resource allocation to a container on a host. For example, in a first directed acyclic graph ("DAG"), a CPU resource usage of a container may be detected. In a second DAG, an I/O resource usage of the container may be detected. In a third DAG, a network traffic resource usage of the container may be detected. Each detected resource may be associated with a distinct control group. Each detected resource usage may be compared to a detected service level objective ("SLO"). Resources that fail to meet the SLO may be adjusted. Each adjusted resource usage may be compared to the SLO, and any resources that continue to fail to meet the SLO may be further adjusted. An orchestrator may be notified when a resource has been adjusted to a threshold limit and the container may be migrated to a second host.

20 Claims, 6 Drawing Sheets

(56) References Cited

U.S. PATENT DOCUMENTS

| | | |
|---|---|---|
| 2015/0149611 A1 | 5/2015 | Lissack |
| 2015/0261514 A1* | 9/2015 | Fu ........................ G06F 9/45558 718/1 |
| 2015/0365309 A1* | 12/2015 | Kaminski ............... H04L 47/70 709/224 |
| 2016/0028595 A1* | 1/2016 | Ramakrishnan .... H04L 41/5025 709/226 |
| 2017/0337138 A1* | 11/2017 | Li ......................... G06F 12/121 |

OTHER PUBLICATIONS

Kannan et al., Resource Usage Monitoring in Kubernetes, May 12, 2015, link: http://blog.kubernetes.io/2015/05/resource-usage-monitoring-kubernetes.html.

Tiwari, Nitish, Monitoring Kubernetes with Heapster, Aug. 16, 2016, link: https://deis.com/blog/2016/monitoring-kubernetes-with-heapster/.

\* cited by examiner

DYNAMICALLY ADJUSTING RESOURCES TO MEET SERVICE LEVEL OBJECTIVES

BACKGROUND

The present disclosure relates generally to the allocation of resources for containers in a host computer system. Containers may operate on a host computer system and may utilize multiple resources to execute tasks. A container may claim different resources that belong to different control groups. The resources may typically include processing (e.g., CPU time), memory (e.g., RAM, disk space), input/output ("I/O"), and network resources. Resource scheduling may provide the container with access to the resources necessary for the container to perform desired tasks.

SUMMARY

The present disclosure provides new and innovative methods and systems for dynamically adjusting control group resource allocation to a container. A central processing unit ("CPU") resource usage of a container in a first host may be detected in a directed acyclic graph ("DAG"). The container may be in a first host. The CPU resource may be associated with a first control group ("cgroup"). An input/output ("I/O") resource usage of the container may be detected in a second DAG. The I/O resource may be associated with a second cgroup. A network traffic resource usage of the container may be detected in a third DAG. The network traffic resource may be associated with a third cgroup. The first, second, and third cgroups may each be different from each other. Further, a service level objective ("SLO") of the host may be detected. Each detected resource usage may be compared to the detected SLO. Each resource that fails to meet the detected SLO may be adjusted. After adjustment, each adjusted resource is compared to the SLO of the host. Each resource that continues to fail to meet the SLO may be further adjusted. When a resource has been adjusted to a threshold limit, an orchestrator may be notified that a resource has been adjusted to the threshold limit. The container may be migrated from the first host to a second host after the resource has been adjusted to the threshold limit.

Additional features and advantages of the disclosed method and apparatus are described in, and will be apparent from, the following Detailed Description and the Figures.

DETAILED DESCRIPTION

At runtime an orchestrator may create a container and may further assign resource scheduling policies to a resource control group of the container. Resource control groups, also referred to as cgroups, may allocate resources to a container. A container may have service level objectives ("SLOs") that represent a target resource delivery. For example, the SLOs may include a target CPU usage time, a target bandwidth, a target memory allocation, and a target I/O command per second capacity. When containers are started on a host, the containers may bind, or connect, certain devices to an operating system ("OS") of the host. For instance, block devices, filesystem directories and host networks may be bound to the OS of the host on which the container runs. These devices may use more than one type of resource, and may rely on resource scheduling to ensure that the container receives the resources it needs. However, a container may be forced into sub-optimal performance. For example, a container may use a device to access a certain cgroup. The device may be bound to the OS of the host, and any limitations associated with the OS. The device, bound by the limits of the host, may offer a resource limit that is below a threshold that the container may need to fulfill the service level objectives of the container. The cgroup may advertise a higher resource limit than it may be able to provide at any given moment because of the limitations of the OS. Additionally, the cgroup may be impacted by factors beyond the control of the cgroup that affect the resource limits. For example, the cgroup may advertise a SLO for bandwidth of twelve Mbit/s, however, due to issues (e.g., connection issues, network problems, interrupts, internal delays), the cgroup may not be able to provide the advertised resource usage. Additionally, heat fluctuations, power fluctuations, and clocking fluctuations may affect performance for certain resources. As such, the cgroup may receive containers with higher resource needs than the cgroup can consistently deliver. As a result, the container may be assigned to a cgroup on a host that cannot supply the resources necessary, the container and the host may be unaware of a potential disparity in resources and the container may suffer from poor performance that violates an agreed on SLO.

The present disclosure addresses the problem discussed above by continuously monitoring the cgroup status and resource usage of a container. A daemon process may monitor the cgroup status and the resource usage. When the daemon process determines that the SLOs of a container are not fully met, the resources may be incrementally changed and rechecked until the resource usages are sufficient to meet the SLOs of the container. By constantly monitoring and adjusting the resource usage of the container and cgroup, the containers performance is enhanced and disparities between advertised and delivered resources are avoided.

Monitoring and adjusting may be performed by a daemon process running on the host. The daemon process may monitor the SLOs of a container and the resource usage of the container. The daemon process may utilize a DAG. The DAG may describe the resources on the host to the devices used by the container. The DAG may further describe the resources provided by the devices to the container. When the SLOs are not being met by the resources, the daemon may notify an orchestrator and the orchestrator may migrate the container to a second host. Manual resource allocation may not provide the same benefit as manual allocation does not have the flexibility or scalability of the present disclosure. By dynamically adjusting the resources available for a container, the problems associated with a container claiming resources by belonging to different resource groups may be mitigated and the container may consistently meet the SLOs agreed upon.

Figure 1:
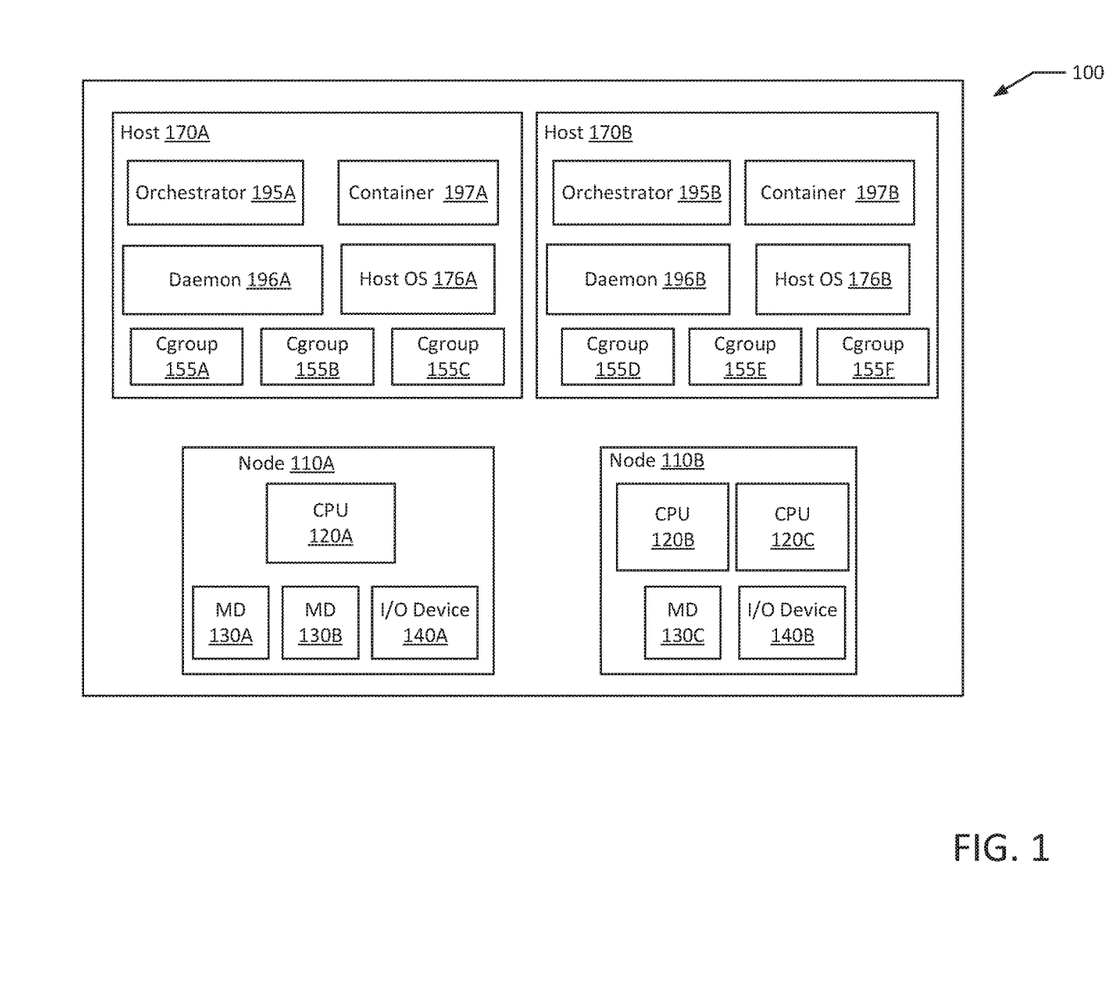
FIG. 1 is a block diagram of a virtualized computer system according to an example of the present disclosure.

FIG. 1 depicts a high level system diagram of an example computer system 100. The computer system 100 may include one or more interconnected nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be connected to a storage controller.

As used herein, physical processor or processor 120A-C refers to a device capable of executing instructions encoding arithmetic, logical, and/or I/O operations or commands. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a CPU.

As discussed herein, a memory device 130A-C refers to a volatile or non-volatile memory device, such as RAM, ROM, EEPROM, or any other device capable of storing data. As discussed herein, I/O device 140 refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-B, including the connections between a processor 120A and a memory device 130A-B and between a processor 120A and/or storage controller may be provided by one or more local buses of suitable architecture, for example, peripheral component interconnect (PCI). As used herein, a device of the host OS 186, or host device, may refer to CPU 120A-C, MD 130A-C, storage controller, a block device, a software device, and/or a hardware device.

The system 100 may include one or more hosts 170A-B. Each host 170A-B may have a host OS 176A-B respectively. The host 170A-B may further include an orchestrator 195A-B. The orchestrator 195A may create container 197A when needed and remove container 197A when no longer needed. Container 197A may share the kernel, or host OS 176A, of host 170A. Container 197A may contain an application or a component of an application. For example, orchestrator 195A may manage container 197A, such that orchestrator 195A migrates container 197A to a second host 170B, detects SLOs of other hosts, (e.g., host 170B) and communicates with other containers (e.g., container 197B) on other hosts (e.g., on host 170B). In an example, daemon 196A may be embedded within orchestrator 195A.

Host 170A-B may be interlinked with other hosts through a connection. The connection may be a point-to-point connection, a serial bus connection or a networked connection. Host 170A may be a server that includes physical or virtual processors and memory.

Each host 170A-B may include a monitor daemon 196A-B for monitoring cgroup 155A-F status as well as resource usage by a container 197A-B located on the host 170A-B. Each cgroup 155A-F may allocate resources, such as CPU, memory, I/O bandwidth and network traffic priorities, to the container 197A-B. Cgroup 155A-C may be on a first host 170A and cgroup 155D-F may be on a second host 170B.

Containers 197A-B may be running on a virtual machine, and the virtual machine may serve as a virtual host. For example, each of hosts 170A and 170B may be a virtual machine which may run on a hypervisor.

Figure 2:
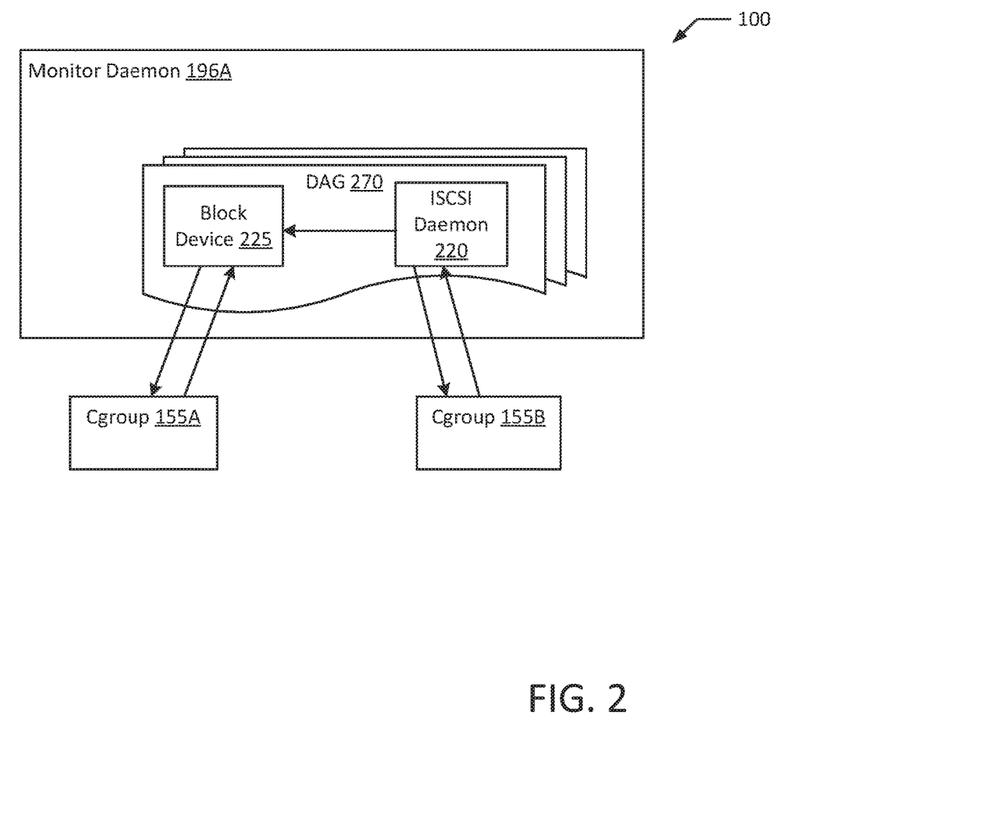
FIG. 2 is a block diagram of a resource allocation system according to an example of the present disclosure.

FIG. 2 is a block diagram of a resource allocation system according to an example of the present disclosure. The example system 200 may include monitor daemon 196A. For example, monitor daemon 196A may be daemon 196A or a different daemon process. Monitor daemon 196A may detect a status of cgroup 155B and a resource usage of a container 197A. Monitor daemon 196A may use DAG 270 which indicates a cgroup status and a resource usage of the container to detect the cgroup status and resource usage of the container.

DAG 270 may be a data structure that indicates a relationship between two or more nodes. For example, a first node of DAG 270 may be an internet small computer system interface ("iSCSI") daemon 220 and a second node of the DAG may be a block device 225. The block device 225 may have been created by the iSCSI daemon 220. The iSCSI daemon 220 may be part of cgroup 155B and the block device 225 may be part of cgroup 155A. The monitor daemon 196A may monitor the resource usage of the block device 225. The monitor daemon 196A may also monitor the cgroup status of the iSCSI daemon 220 as part of monitoring the cgroup status of cgroup 155B. Further, the DAG may include three nodes, a network traffic cgroup, an iSCSI daemon and a block device cgroup.

In another example, the DAG may include three nodes. A container may use glusterFS® as a remote file system, and accordingly may mount the filesystem using a local glusterFS® daemon process. A first node may be a network traffic cgroup, a second node may be a glusterFS® mount daemon and a third node may be an I/O cgroup. The local glusterFS® daemon may be controlled by a cgroup.

In another example, the DAG may include two branches of three nodes each. The first branch may include a network traffic cgroup, a distributed replicated block device ("DRBD") daemon and an I/O cgroup. The other branch may include a memory cgroup, a CPU cgroup and the I/O cgroup. A container may use block storage provided by DRBD that may provide a daemon to sync the local block storage with remote replicas. The DRBD's performance may be determined by the amount of CPU resource available, the memory resources available and the network traffic resources available.

The same cgroup may be part of more than one DAG, for example, a first DAG may include a block device cgroup and I/O cgroup. A second DAG may have a block device cgroup and a CPU cgroup. DAG 270 may be a data structure that is stored within the daemon process of the monitor daemon 196A. DAG 270 may represent data that depends from one node to the next such that there are no directed cycles. In other words, DAG 270 may represent dependent data such that DAG 270 may follow dependency from sink to source. Alternatively to DAG 270, the same, or substantially the same, information may be represented in a different dependency chain or dependency table capable of depicting a cgroup status and a resource usage. The monitor daemon may use the different dependency chain or dependency table as a replacement for DAG 270.

Figure 3:
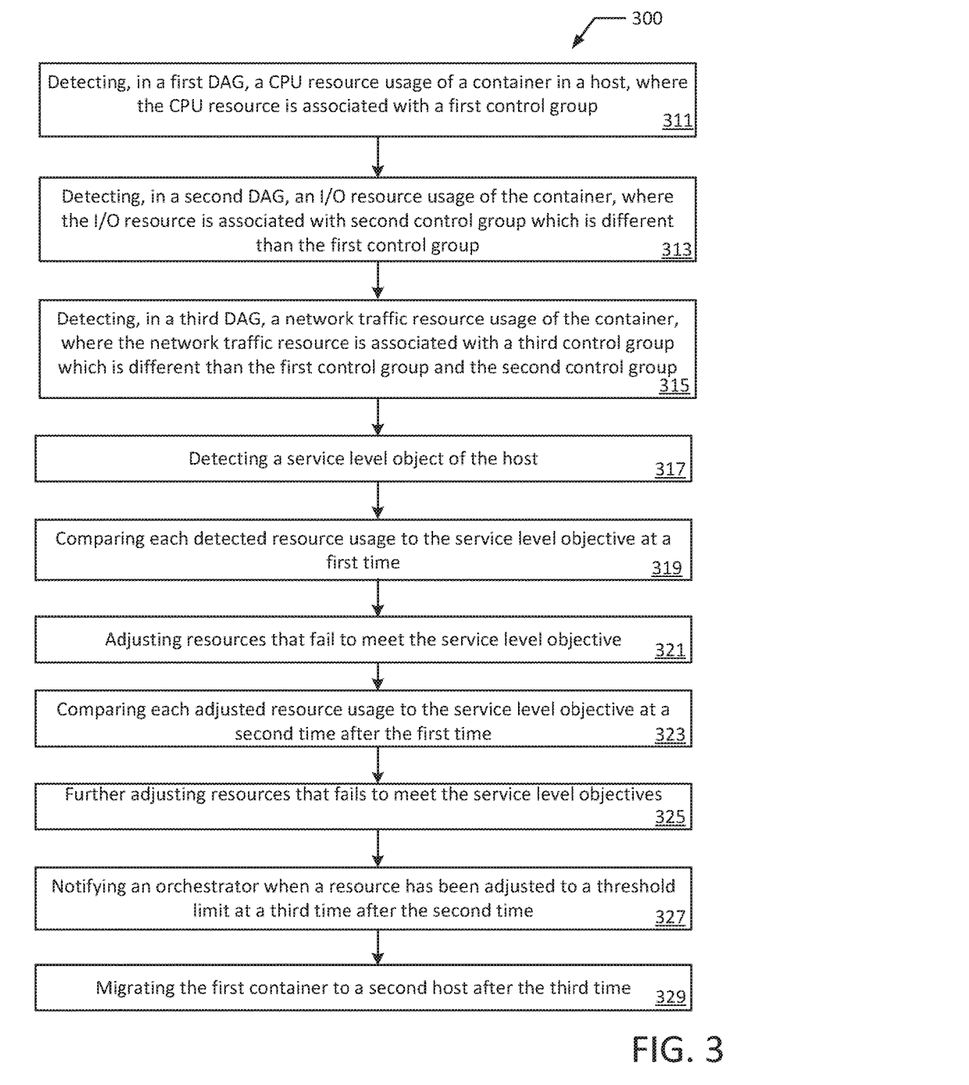
FIG. 3 is a flowchart illustrating an example method for dynamically allocating resources according to an example of the present disclosure.

FIG. 3 is a flowchart illustrating an example method for dynamically allocating resources according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example, the method 300 may be performed by processing logic that may comprise hardware (circuitry, dedicated logic, etc.), software, or a combination of both.

The example method 300 starts with detecting, in a first DAG, a CPU resource usage of a first container in a first host, where the CPU resource is associated with a first control group (block 311). For example, monitor daemon 196A may detect in DAG 270 a CPU resource usage associated with cgroup 155A. At one point in time, monitor daemon 196A may detect that container 197A is receiving fifteen thousand cycles per second of the total CPU resource available in the cgroup 155A. Cgroup 155A may have allocated 20% of available CPU capacity of cgroup 155A to container 197A. Cgroup 155A may advertise a total CPU capacity of one hundred thousand cycles per second. The actual resource usage of container 197A may be different than the allocated percentage of the advertised resources of the cgroup 155A because of the reasons discussed above (e.g., connection issues, network problems, interrupts, internal delays, heat fluctuations, power fluctuations, and clocking fluctuations). Accordingly, container 197A may not receive the full 20% of one hundred thousand cycles per second at any given time.

In a second DAG, an I/O resource usage of the first container may be detected, where the I/O resource usage is associated with a second control group which is different than the first control group (block 313). For example, monitor daemon 196A may detect in a second DAG an I/O resource usage associated with cgroup 155B. At another point in time, monitor daemon 196A may detect in the second DAG that container 197A is able to send one hundred I/O commands per second ("IOPS"). Cgroup 155B may have allocated 10% of available I/O capacity of cgroup 155B to container 197A. Cgroup 155B may advertise a total capacity of 1200 IOPS. The actual resource usage of container 197A may be different than the allocated percentage of the advertised resources of the cgroup 155B because of the reasons discussed above (e.g., connection issues, network problems, interrupts, internal delays, heat fluctuations, power fluctuations, and clocking fluctuations). Accordingly, container 197A may not receive the full 12% of 1200 IOPS at any given time.

In a third DAG, a network traffic resource usage of the first container may be detected, where the network traffic resource usage is associated with a third control group which is different than the first control group and the second control group (block 315). For example, monitor daemon 196A may detect in a third DAG a network resource usage associated with cgroup 155C. At another point in time, monitor daemon 196A may detect in the third DAG that container 197A utilizes 4 Mbit/s network speed. Cgroup 155C may have allocated 12% of available bandwidth of the cgroup 155C to container 197A. Cgroup 155C may advertise a total bandwidth of fifty Mbit/s. The actual resource usage of container 197A may be different than the allocated percentage of the total resources of the cgroup 155C because of the reasons discussed above (e.g., connection issues, network problems, interrupts, internal delays, heat fluctuations, power fluctuations, and clocking fluctuations). Accordingly, container 197A may not receive the full 10% of fifty Mbit/s at any given time.

The service level objectives of the host may be detected (block 317). For example, the monitor daemon 196A may detect SLOs of host 170A. At another point in time, the SLOs may indicate that a host has a SLO of fifteen thousand cycles per second of CPU utilization that the host can dedicate to a container, that the host has committed to sending one hundred twenty IOPS from the container and that the host has committed to providing six Mbit/s network speed for the container. In an example, the monitor daemon 196A may detect CPU usage, I/O capacity, network speed and the SLOs at the same time or substantially simultaneously.

Each detected resource usage may be compared to the service level objective at a first time (block 319). For example, monitor daemon 196A may then compare each detected resource usage, the CPU resource usage, the I/O resource usage, and the network traffic resource usage, to the SLOs detected by the monitor daemon 196A. Further in this regard, monitor daemon 196A may then compare the detected fifteen thousand cycles per second CPU resource usage to the twenty thousand cycles per second CPU utilization SLO of the first host, as well as compare the detected one hundred IOPS to the one hundred twenty IOPS SLO of the first host and additionally compare the detected four Mbit/s with the six Mbit/s SLO of the first host.

Each resource that fails to meet the SLO may be adjusted (block 321). For example, monitor daemon 196A may then automatically and incrementally increase the CPU resource of cgroup 155A such that the container 197A is allocated an additional percentage of the CPU resources of cgroup 155A for a total of 22% of the CPU resources in cgroup 155A. Monitor daemon 196A may also automatically and incrementally increase the IOPS of cgroup 155B such that container 197A is receiving a total of 11% of total IOPS of cgroup 155B. Monitor daemon 196A may further automatically and incrementally adjust the network resources of cgroup 155C such that container 197A may receive 12% of total bandwidth of cgroup 155C.

Monitor daemon 196A may automatically and incrementally adjust the resource of a cgroup by accessing the cgroup and changing the allocation within the cgroup. For example, monitor daemon 196A may access cgroup 155A and change the resource that is allocated to that cgroup. Monitor daemon 196A may detect that a first resource usage is not meeting the SLO and may increase the resource within the DAG, which may in turn increase the allocation within the cgroup. Monitor daemon 196A may then detect in the first DAG an adjusted CPU resource usage, in a second DAG, an adjusted I/O resource usage, and in a third DAG an adjusted network resource usage.

Each adjusted resource usage may be compared to the service level objectives of the host at a second time that is after the first time (block 323). For example, monitor daemon 196A may, after adjusting the resources that fail to meet the SLOs, compare each adjusted resource to the SLOs of host 170A. Monitor daemon 196A may compare the 22% adjusted CPU resource of cgroup 155A, the 11% adjusted IOPS of cgroup 155B, and the 9% adjusted network bandwidth of cgroup 155C, with the SLOs of host 170A. Monitor daemon 196A may detect: in cgroup 155A that the increased 22% of total CPU resource provides container 197A with seventeen thousand cycles per second; in cgroup 155B that the increased 11% of total I/O usage of cgroup 155B provides container 197A with 108 IOPS; and in cgroup 155C that the increased 9% of total bandwidth of cgroup 155C provides container 155C with 8.2 Mbit/s.

Resources that fail to meet the service level objectives may be further adjusted (block 325). For example, monitor daemon 196A may then further automatically and incrementally adjust the CPU resource of cgroup 155A such that the container 197A is allocated an additional percentage of the CPU resources of cgroup 155A for a total of 24% of the CPU resources in cgroup 155A. Monitor daemon 196A may also automatically and incrementally increase the IOPS of cgroup 155B such that container 197A receives 12% of total I/O resources in cgroup 155B. Monitor daemon 196A may further automatically and incrementally adjust the network resources of cgroup 155C such that container 197A may receive 10% of total bandwidth of cgroup 155C.

An orchestrator may be notified when a resource has been adjusted to a threshold limit at a third time after the second time (block 327). For example, monitor daemon 196A may notify orchestrator 195A when a resource has been adjusted to a threshold limit after resources have been further adjusted.

In an example, Cgroup 155C may include a threshold limit. A threshold limit may be a limit that a resource cannot be increased beyond. For example, cgroup 155C may only have access to a total bandwidth of 50 Mbit/s, and may allocate the total bandwidth between ten hosts. Cgroup 155C may initially allocate each host 8% of the total bandwidth available, so a total of 80% of the bandwidth available is allocated. Additionally, cgroup 155C may have a threshold limit of 15% of the total bandwidth for any single host. The allocation to the container on the first host 170A may be adjusted such that the first container receives 15% of the total bandwidth in cgroup 155C. The other two hosts may also have their bandwidth increased if the other hosts are not meeting their own SLOs. Such an increase may be of the same incremental percentage increase or a different adjustment. The container of the first host 170A may not satisfy the SLO after being adjusted, and may further be incrementally adjusted. The resource may be adjusted to the threshold limit of 15% of the total bandwidth of cgroup 155C.

Monitor daemon 196A may notify orchestrator 195A when the resource of 155C has been adjusted to the threshold limit. Alternatively, monitor daemon 196A may notify orchestrator 195A when an adjusted resource approaches a threshold limit, such as within 10% of a threshold limit, within 5% of a threshold limit, or within 1% of a threshold limit. A notification before the resource is adjusted to the threshold limit may provide additional time for orchestrator 195A to identify an appropriate second host 170B so that, if the first host 170A is incapable of meeting the required SLOs, the system may quickly transition to the second host 170B.

In another example, cgroup 155B may have access to a single processor that is shared between four hosts for transferring I/O commands from each of the four hosts that advertises the ability to handle six hundred IOPS. A first host may be a virtual host and have an SLO of ninety IOPS, a second host may be located on a first node of a server and have an SLO of one hundred twenty IOPS, a third host may be on a second node of the same server and have an SLO of ninety IOPS, and a fourth host may be on a different server may have an SLO of one hundred fifty IOPS. Cgroup 155B may initially allocate each host 15% of the I/O capacity of the processor. Cgroup 155B may additionally have a threshold limit of 30% of the total I/O capacity available in cgroup 155B. Due to errors (e.g., power supply errors, over heating issues, faulty connectors, clock errors, interrupts, etc.), the actual capacity of the processor at any given time may be that only four hundred fifty I/O commands may be handled per second. Each host may have their I/O resource usage increased to 20%, allowing the first and third hosts to meet their SLOs, additionally, the second host may have its I/O resource usage further increased to 28%, allowing the second host to meet its SLO. However, the fourth host may have its I/O resource usage further increased to the threshold limit of 30% (i.e., one hundred thirty-five IOPS). The fourth host may not meet its SLO of one hundred fifty IOPS despite being raised to the threshold limit.

The first container may be migrated to a second host after the third time (block 329). For example, orchestrator 195A may migrate container 197A from host 170A to host 170B after orchestrator has been notified that the network resource has been adjusted to 50% and the SLO is still not satisfied. Orchestrator 195A may detect threshold limits of host 170B and compare the detected threshold limits with the current resource usages to determine a second host 170B to which container 197A may be migrated.

Figure 4A:
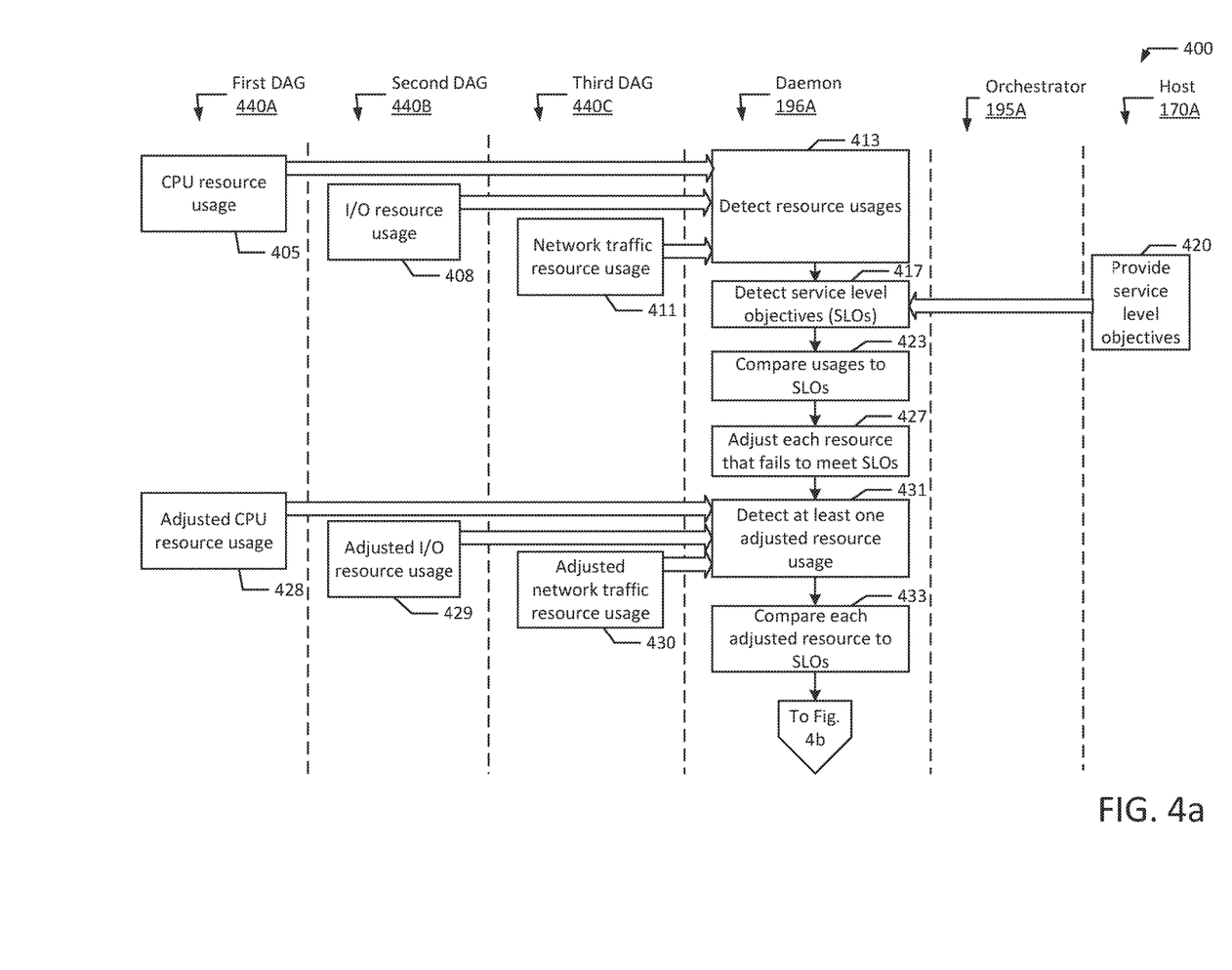
FIGS. 4a and 4b are flow diagrams of resource allocation according to an example of the present disclosure.
Figure 4B:
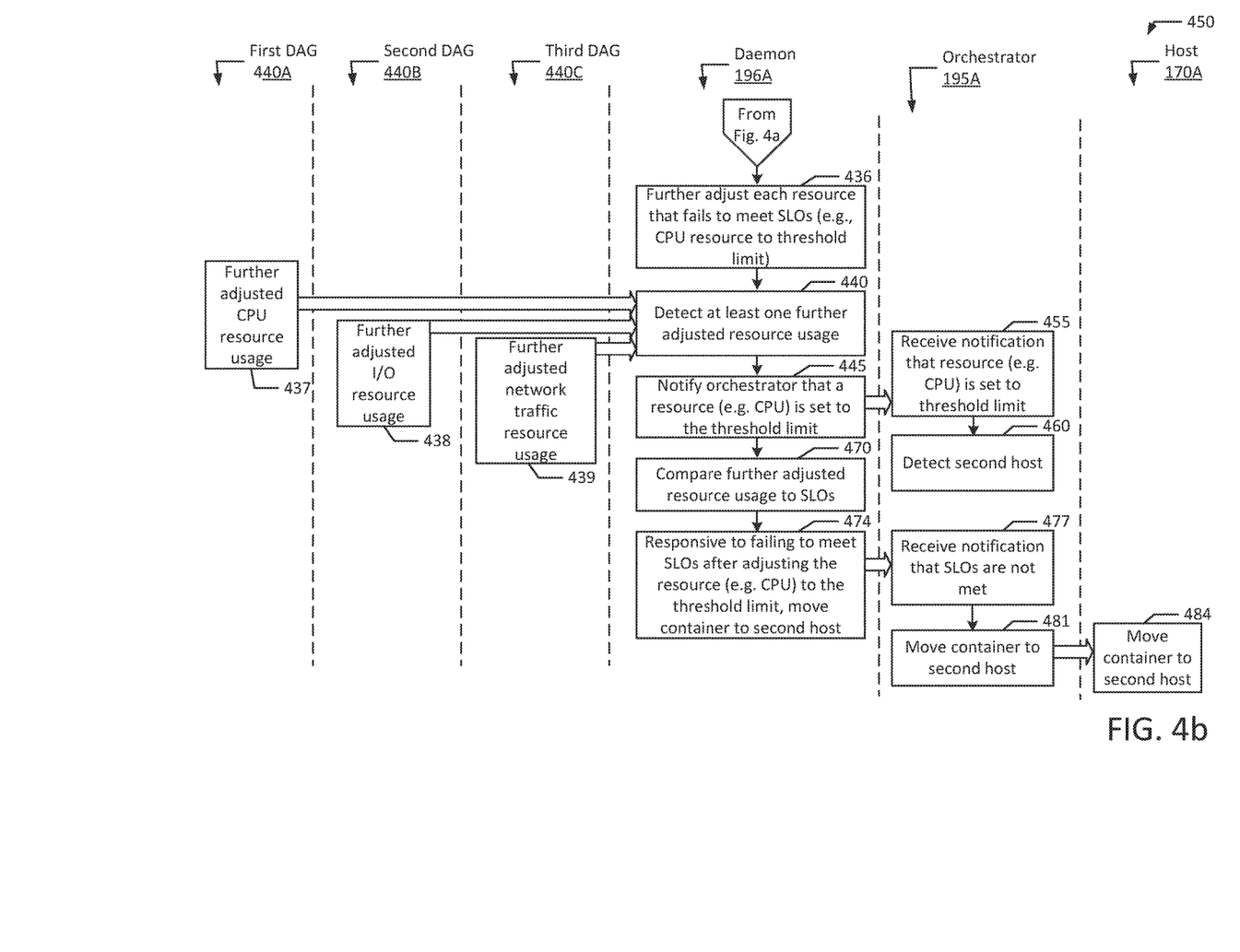

FIGS. 4a and 4b are flow diagrams of resource allocation according to an example of the present disclosure. FIG. 4a depicts an example process 400 showing a first DAG 440A, a second DAG 440B, a third DAG 440C, a daemon 196A, an orchestrator 195A and a host 170A. Daemon 196A may detect resources usages of a container (block 413). In the first DAG 440A, daemon 196A may detect a CPU resource usage of a container (block 405). For example, daemon 196A may detect that a container receives four hundred thousand cycles per second of the total CPU resources of a first cgroup by observing the first DAG 440A. The first cgroup may have allocated 25% of an advertised two million cycles per second. However, as discussed above, the first cgroup may not be able to provide the advertised resources at any given time.

In the second DAG 440B, the daemon 196A may detect an I/O resource usage of a container (block 408). For example, daemon 196A may detect that the container is sending two hundred IOPS via a second cgroup by observing the second DAG 440B. The second cgroup may have allocated 25% of an advertised one thousand IOPS. However, as discussed above, the second cgroup may not be able to provide the advertised resources at any given time.

In the third DAG 440C, the daemon 196A may detect a network traffic resource usage of a container (block 411). For example, daemon 196A may detect that the container is using twenty Mbit/s through a third cgroup by observing the third DAG 440C. The third cgroup may have allocated 20% of an advertised one hundred twenty five Mbit/s. However, as discussed above, the third cgroup may not be able to provide the advertised resources at any given time. Daemon 196A may further detect additional resources used by the container. Resources may additionally include, for example, network traffic priorities or an amount of memory available or an amount of memory used.

The daemon 196A may detect service level objectives (block 417). Daemon 196A may detect SLOs which may be provided by the host 170A (block 420). Daemon 196A may detect that host 170A has a set of agreed upon SLOs 420, for example, five hundred thousand cycles per second of the CPU resources available in a first cgroup, two hundred fifty IOPS through a second cgroup, and twenty-five Mbit/s through a third cgroup. As part of the SLOs, daemon 196 may detect a threshold limit of each cgroup that is part of the host 170A. The threshold limit may indicate the highest allowable resource allocation that a cgroup can provide for a container. Daemon 196A may detect a threshold limit of 30% of total CPU resources for the first cgroup, 30% of total IOPS for the second cgroup, and 25% of total bandwidth for the third cgroup.

The daemon may compare the resource usages to the SLOs of the first host (block 423). For example, the daemon 196A may compare the detected CPU resource of four hundred thousand cycles per second of CPU resource with the detected SLO of five hundred thousand cycles per second of CPU resource and determine that the resource allocation of the CPU resource needs to be increased. The daemon 196A may also compare the detected I/O resource usage of two hundred IOPS with the detected SLO of two hundred fifty IOPS, and further determine that the resource allocation of the IOPS needs to be increased. The daemon 196A may further compare the detected network traffic resource usage of twenty Mbit/s with the detected SLO of twenty-five Mbit/s and may determine that the resource allocation of the network traffic resource needs to be increased.

The daemon may adjust each resource that fails to meet the SLO (block 427). For example, daemon 196A may adjust each resource by adjusting the resource allocation within the cgroup. Daemon 196A may automatically and incrementally adjust the resources, for instance, the CPU resource of the container may be adjusted from 25% to 27% of total CPU resource of the first cgroup by adjusting the resource allocation within the first cgroup. Daemon 196A may further adjust the I/O resource usage from 25% to 26.5% of total IOPS of the second cgroup. The adjustment may be automatic and incremental after the comparison of the detected resource usages to the SLOs. Daemon 196A may also adjust the network traffic resource from 20% to 21% of the total bandwidth of the third cgroup. The adjustment may also be automatic and incremental after the comparison of the detected resource usages to the SLOs.

The daemon may then detect at least one adjusted resource usage (block 431). Daemon 196A may detect each adjusted resource usage. For example, daemon 196A may detect the adjusted CPU resource usage (block 428), the adjusted I/O resource usage (block 429) and the adjusted network traffic resource usage (block 430). The daemon 196A may detect that the container is receiving four hundred twenty-five thousand cycles per second of CPU resource usage, two hundred twenty IOPS and twenty-three Mbit/s of network resources. The frequency of adjustment and detection may be high frequency for real-time applications such as video streaming, trading, and paid or enterprise containers (e.g., every one hundred ms, or every fifty ms, or every forty ms). The frequency of adjustment and detection may be lower frequency for long running processes such as web and database services (e.g., every two hundred ms, or every five hundred ms, or every second). The sampling frequency may be adjustable to the needs of the container and may be different for different resources. For example, more volatile resources may have a higher frequency of detection.

The daemon may compare the adjusted resource usages to the SLOs of the first host 170A (block 433). For example, the daemon 196A may compare the detected adjusted CPU resource of four hundred twenty-five thousand cycles per second with the detected SLO of five hundred thousand cycles per second and determine that the resource allocation of the CPU resource needs to be increased. The daemon 196A may also compare the detected I/O resource usage of two hundred twenty IOPS with the detected SLO of two hundred fifty IOPS, and further determine that the resource allocation of the IOPS needs to be increased. The daemon 196A may further compare the detected network traffic resource usage of twenty-three Mbit/s with the detected SLO of twenty-five Mbit/s and may determine that the resource allocation of the network traffic resource needs to be increased.

Continuing on from FIG. 4a, FIG. 4b depicts an example process 450 showing a first DAG 440A, a second DAG 440B, a third DAG 440C, a daemon 196A, an orchestrator 195A and a host 170A, where the daemon 196A further adjusts resource limits and moves the container to a second host.

The daemon 196A may further adjust each resource that fails to meet the SLOs (block 436). For example, daemon 196A may further adjust the CPU resource to a threshold limit of 30% of a first cgroup (e.g., cgroup 155A), daemon 196A may adjust the I/O resource usage to a threshold limit of 30% of the total IOPS of a second cgroup (e.g., cgroup 155B), and daemon 196A may adjust the network traffic resource to a threshold limit of 25% of the total bandwidth of a third cgroup (e.g., cgroup 155C). Each further adjustment of resources may be automatic after, or as part of, comparing the adjusted resource to the SLO. Daemon 196A may not immediately adjust each resource that fails to meet the SLO to the threshold limit. An incremental and automatic adjustment may prevent excessive resource allocation that may occur when immediately adjusting to a threshold limit.

The daemon may then detect each further adjusted resource usage (block 440). For example, daemon 196A may detect the further adjusted CPU resource usage (block 437), the further adjusted I/O resource usage (block 438) and the further adjusted network traffic resource usage (block 439). In another example, only one resource (e.g., CPU) may be adjusted when only one resource (e.g., CPU) does not meet the SLOs.

The daemon may then notify orchestrator 195A that a resource has been adjusted to or is set to the threshold limit (block 445). The orchestrator 195A may receive a notification from the daemon (block 455). Then, the orchestrator 195A may detect a second host (460). For example, upon receipt from daemon 196A of a notification that the CPU resource of the container has been set to the threshold limit of 30%, the orchestrator 195A may search for and detect a host that has a resource availability advertised that allows for greater resources than the first host. Thus, the second host may provide the container additional resources that the first host 170A provided that did not meet the SLOs. The second host may be on the same server as the first host. Alternatively, the second host may be on a second server, distinct from a server where the first host is.

The daemon may compare the further adjusted resource usages to the SLOs of the host (block 470). For example, daemon 196A may then compare the detected further adjusted CPU resource of 30%, which may only provide the container with four hundred eighty thousand cycles per second of CPU resources with the detected SLO of five hundred thousand cycles per second CPU resources and determine that the resource allocation of the CPU resource is insufficient. The daemon 196A may also compare the detected I/O resource usage of two hundred fifty IOPS with the detected SLO of two hundred fifty IOPS, and further determine that the resource allocation of the IOPS has been met. The daemon 196A may further compare the detected network traffic resource usage of twenty-two Mbit/s with the detected SLO of twenty-five Mbit/s and may determine that the resource allocation of the network traffic resource is insufficient.

Responsive to failing to meet the SLOs after adjusting the resources, the container may be moved to the second host (block 474). For example, in response to determining that the SLO was not met by the threshold adjustment of the CPU, the daemon 196A may transmit a notification to the orchestrator 195A that the resource allocation of the CPU has not met the SLO despite being at the threshold limit, and the daemon 196A may request that the container be moved to a second host.

The orchestrator 195A may receive a notification that the SLOs are not met (block 477). The orchestrator 195A may move the container to a second host (block 481). The first host may assist in moving the container to a second host (block 484). For example, orchestrator 195A may have already detected a second host 170B that has a higher threshold limit than the already reached limit of the first host 170A. The orchestrator 195A may move the container from the first host 170A to the second host 170B.

Figure 5:
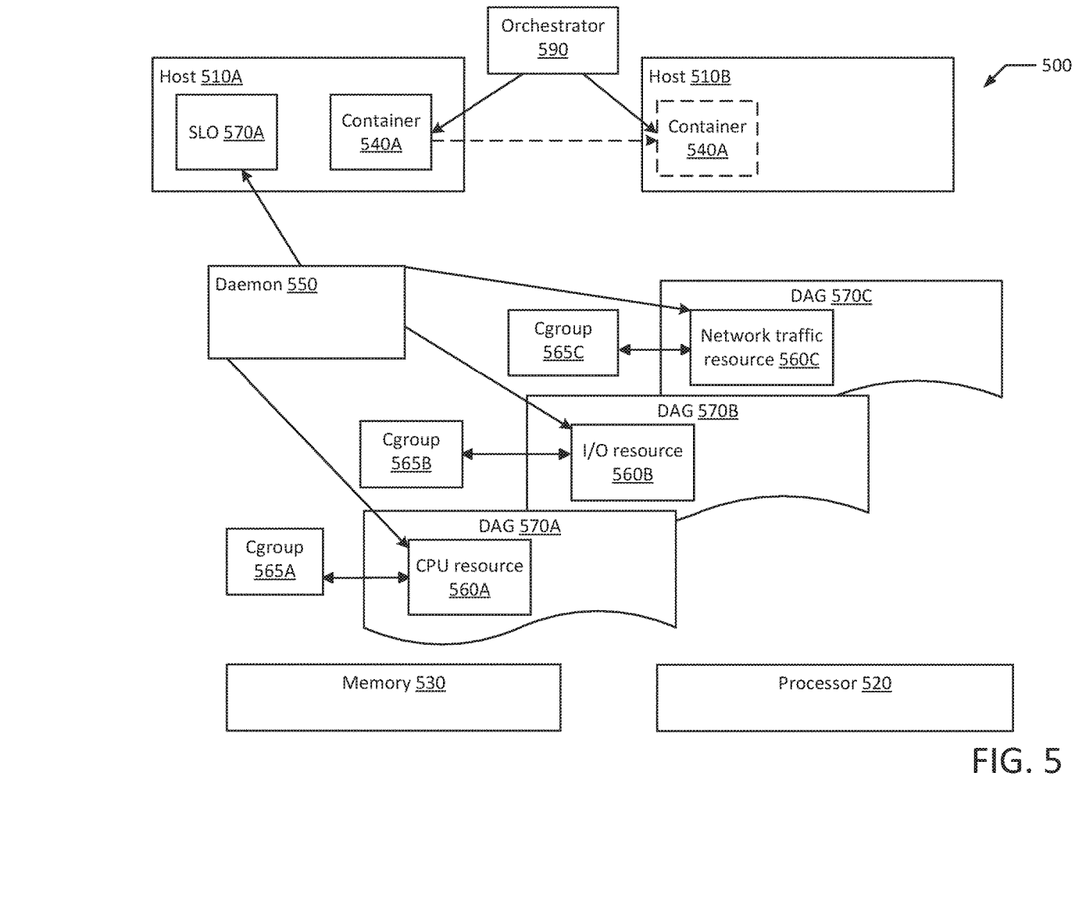
FIG. 5 is a block diagram of a resource allocation system according to an example of the present disclosure.

FIG. 5 is a block diagram of a resource allocation system according to an example of the present disclosure. System 500 includes a memory 530 coupled to a processor 520, a container 540A on a first host 510A, a second host 510B, and a daemon 550. Daemon 550 may detect in a first DAG 570A, a CPU resource usage 560 of the container 540 in the first host 510A. The CPU resource 560A may be associated with a first control group 565A. Daemon 550 may detect, in a second DAG 570B, an I/O resource usage 560B of the container 540A. The I/O resource 560B may be associated with a second control group 565B, which is different than the first control group 565A. Daemon 550 may detect, in a third DAG 570C, a network traffic resource usage 560C of the first container 540A. The network traffic resource 560C may be associated with a third control group 565C, which is different than the second control group 565B. Daemon 550 may detect a service level objective 570A of the first host 510A. Daemon 550 may compare each detected resource usage 560A-C to the service level objective 570A at a first time. Daemon 550 may then adjust each resource 560A-C that does not meet the service level objective 570A. Daemon 550 may compare each adjusted resource usage to the service level objective 570A at a second time after the first time. Daemon 550 may further adjust each resource that does not meet the service level objective 570. Daemon 550 may then notify the orchestrator 590 when a resource has been adjusted to a threshold limit at a third time after the second time. Orchestrator 590 may migrate the first container 540A to the second host 510B after the resource has been adjusted to the threshold limit.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention claimed is:

1. A method for dynamically adjusting a container control group resource allocation comprising:
    detecting at a first frequency, in a first directed acyclic graph (DAG), a CPU resource usage of a first container in a first host, wherein the CPU resource is associated with a first control group;
    detecting at a second frequency, in a second DAG, an I/O resource usage of the first container, wherein the I/O resource is associated with a second control group which is different than the first control group;
    detecting at a third frequency, in a third DAG, a network traffic resource usage of the first container, wherein the network traffic resource is associated with a third control group which is different than the first control group and the second control group, wherein the first frequency is different from the second frequency and the third frequency, wherein the second frequency is different from the third frequency;
    detecting a service level objective of the first host;
    comparing each detected resource usage to the service level objective at a first time;
    automatically adjusting each resource that fails to meet the service level objective by a first incremental amount;
    comparing each adjusted resource usage to the service level objective at a second time after the first time, wherein a difference between the second time and the first time corresponds to a respective frequency of each adjusted resource;
    further automatically adjusting each resource that fails to meet the service level objective by a second incremental amount;
    notifying an orchestrator when a resource has been adjusted to a threshold limit at a third time after the second time; and
    migrating the first container to a second host after the resource has been adjusted to the threshold limit.

2. The method of claim 1, wherein a daemon detects the CPU resource usage, the I/O resource usage, and the network traffic resource usage.

3. The method of claim 2, wherein the daemon is embedded in the orchestrator.

4. The method of claim 1, wherein the first control group, the second control group, and third control group are on a first server.

5. The method of claim 4, wherein the second host is on a second server.

6. The method of claim 1, wherein the first host is a virtual machine.

7. The method of claim 1, wherein the orchestrator migrates the first container to the second host.

8. The method of claim 1, wherein the second host has a different service level objective than the first host.

9. A system for dynamically adjusting a container control group resource allocation comprising:
    a memory;
    a processor;
    a first container, wherein the first container is in a first host;
    a second host;
    an orchestrator; and a daemon, wherein the daemon:
- detects at a first frequency, in a first directed acyclic graph (DAG), a CPU resource usage of the first container in the first host, wherein the CPU resource is associated with a first control group;
- detects at a second frequency, in a second DAG, an I/O resource usage of the first container, wherein the I/O resource is associated with a second control group which is different than the first control group;
- detects at a third frequency, in a third DAG, a network traffic resource usage of the first container, wherein the network traffic resource is associated with a third control group which is different than the second control group, wherein the first frequency is different from the second frequency and the third frequency, wherein the second frequency is different from the third frequency;
- detects a service level objective of the first host;
- compares each detected resource usage to the service level objective at a first time;
- automatically adjusts each resource that does not meet the service level objective by a first incremental amount;
- compares each adjusted resource usage to the service level objective at a second time after the first time, wherein a difference between the second time and the first time corresponds to a respective frequency of each adjusted resource;
- further automatically adjusts each resource that does not meet the service level objective by a second incremental amount; and
- notifies the orchestrator when a resource has been adjusted to a threshold limit at a third time after the second time, wherein the orchestrator migrates the first container to the second host after the resource has been adjusted to the threshold limit.

10. The system of claim 9, wherein the daemon is embedded in the orchestrator.

11. The system of claim 9, wherein the first control group, the second control group, and third control group are on a first server.

12. The system of claim 11, wherein the second host is on a second server.

13. The system of claim 9, wherein the first host is a virtual machine.

14. The system of claim 9, wherein the second host has a different service level objective than the first host.

15. The system of claim 9 further comprising a second container, wherein the second container is in the first host.

16. The system of claim 15, wherein the daemon detects a CPU resource usage of the second container, an I/O resource usage of the second container and a network traffic resource usage of the second container.

17. The system of claim 16, wherein the first container and second container belong to the first control group and share the resources of the first control group.

18. The system of claim 17, wherein the second host has a fourth control group, a fifth control group and a sixth control group.

19. The system of claim 18, wherein a second CPU resource belongs to the fourth control group, a second I/O resource belongs to the fifth control group, and a second network traffic resource belongs to the sixth control group.

20. A non-transitory computer readable medium storing instructions, which when executed, cause a daemon to:
- detect at a first frequency, in a first directed acyclic graph (DAG), a CPU resource usage of a first container in a first host, wherein the CPU resource is associated with a first control group;
- detect at a second frequency, in a second DAG, an I/O resource usage of the first container, wherein the I/O resource is associated with a second control group which is different than the first control group;
- detect at a third frequency, in a third DAG, a network traffic resource usage of the first container, wherein the network traffic resource is associated with a third control group which is different than the first control group and the second control group, wherein the first frequency is different from the second frequency and the third frequency, wherein the second frequency is different from the third frequency;
- detect a service level objective of the first host;
- compare each detected resource usage to the service level objective at a first time;
- automatically adjust each resource that fails to meet the service level objective by a first incremental amount;
- compare each adjusted resource usage to the service level objective at a second time after the first time, wherein a difference between the second time and the first time corresponds to a respective frequency of each adjusted resource;
- further automatically adjust each resource that fails to meet the service level objective by a second incremental amount;
- notify an orchestrator when a resource has been adjusted to a threshold limit at a third time after the second time; and
- further cause the orchestrator to migrate the first container to a second host after the resource has been adjusted to the threshold limit.

* * * * *